United States Patent
Lee et al.

(10) Patent No.: US 8,225,913 B2
(45) Date of Patent: Jul. 24, 2012

(54) DAMPER FOR CONTINUOUSLY VARIABLY ADJUSTING DAMPING FORCE

(75) Inventors: Dong-Rak Lee, Busan (KR); Min-Ho Chin, Busan (KR)

(73) Assignee: S & T Daewoo Co. Ltd., Busan (KR)

( * ) Notice: Subject to any disclaimer, the term of this patent is extended or adjusted under 35 U.S.C. 154(b) by 209 days.

(21) Appl. No.: 12/757,105

(22) Filed: Apr. 9, 2010

(65) Prior Publication Data
US 2010/0263971 A1    Oct. 21, 2010

(30) Foreign Application Priority Data

Apr. 16, 2009  (KR) .................. 10-2009-0033068
Mar. 16, 2010  (KR) .................. 10-2010-0023181

(51) Int. Cl.
*F16F 9/53* (2006.01)

(52) U.S. Cl. ............... 188/267.2; 188/314; 267/179
(58) Field of Classification Search ............... 188/31, 188/314, 267, 267.1, 267.2; 267/170–179; 138/31
See application file for complete search history.

(56) References Cited

U.S. PATENT DOCUMENTS

| | | | | |
|---|---|---|---|---|
| 2,856,035 A | * | 10/1958 | Rohacs | 188/269 |
| 3,848,710 A | * | 11/1974 | Thompson et al. | 188/280 |
| 4,905,574 A | * | 3/1990 | Trevisan | 92/69 R |
| 5,450,933 A | * | 9/1995 | Schuttler | 188/300 |
| 5,664,848 A | * | 9/1997 | Muraski | 303/87 |
| 6,086,060 A | * | 7/2000 | Berthold | 267/64.15 |
| 6,360,856 B1 | * | 3/2002 | Koh | 188/267.1 |
| 7,270,320 B2 | * | 9/2007 | Menzel et al. | 267/175 |

FOREIGN PATENT DOCUMENTS

DE  2744301 A  *  4/1979

* cited by examiner

*Primary Examiner* — Bradley King
(74) *Attorney, Agent, or Firm* — Duane Morris LLP

(57) ABSTRACT

Disclosed is a damper for continuously variably adjusting a damping force that includes: a cylinder; a piston rod that is inserted into the cylinder and moves back and forth; a piston valve that is coupled to a bottom portion of the piston rod and moves back and forth in the cylinder according to the movement of the piston rod; a MR fluid that fills the cylinder and moves between a tension space over the piston valve and a compression space below the piston valve; and a volume compensation means that is located in the cylinder and compensates for a volume change of an inner space of the cylinder due to the movement of the piston rod, the volume compensation means including: a floating plunger that is configured to be below the piston valve and capable of moving up and down; a coil spring that is coupled to a bottom surface of the floating plunger and supports the floating plunger; and a support cup that is fixed onto the cylinder, coupled to a bottom portion of the coil spring to support the coil spring, and forms a buffer space, along with the floating plunger, between the support cup and the floating plunger.

5 Claims, 4 Drawing Sheets

DAMPER FOR CONTINUOUSLY VARIABLY ADJUSTING DAMPING FORCE

This application claims the benefit of Korean Patent Application Nos. 10-2009-0033068 and 10-2010-0023181 filed on Apr. 16, 2009 and Mar. 16, 2010, respectively, which are hereby incorporated by reference.

BACKGROUND OF THE INVENTION

1. Field of the Invention

The present invention relates to a damper for continuously variably adjusting a damping force, and more particularly, to a damper for continuously variably adjusting a damping force for vibration occurring when driving on road.

2. Discussion of the Related Art

Generally, a suspension is equipped between a vehicle body and a vehicle wheel in order to improve ride comfort. The suspension includes a chassis spring that absorbs vibration and shock due to a road surface, and a damper that damps free vibration of the chassis spring in order to improve ride comfort.

The damper functions to absorb and quickly damp the vibration of the chassis spring.

Recently, an active control type suspension is widely used for a high-end vehicle. The active control type suspension adjusts a damping force by detecting a vehicle status using a sensor then getting feedback on the detected result thus electronically controlling a damping operation in response to the feedback.

There are various methods for electronically controlling a damping force of a damper. Generally, provided is a method of forming a fluid path in a piston valve traveling back and forth in a cylinder and adjusting a flow behavior of the fluid passing through the fluid path. As to this method, there is a method of adjusting a cross-sectional area of the fluid path, and a method of filling the cylinder with an Electro-Rheological fluid or a Magneto-Rheological (MR) fluid and adjusting a flow resistance of the fluid using an electric or magnetic property of the fluid.

FIG. 1 is a cross-sectional view illustrating a structure of a damper for continuously variably adjusting a damping force using an MR fluid according to the related art.

Referring to FIG. 1, the damper 10 includes a cylinder 12 that is open at one end thereof and has a hollow space along a length direction thereof, a piston rod 14 that is inserted into the cylinder 12 and moves back and forth, and a piston valve 16 that is coupled to a bottom portion of the piston rod 14 and moves back and forth in the cylinder 12.

A solenoid core 161 inducing an electromagnetic field is equipped in the piston value 16.

With respect to the piston valve 16, an inside of the cylinder 12 is divided into a compression space 12a below the piston value 16 and a tension space 12b over the piston valve 16. The compression space 12a and the tension space 12b are filled with an MR fluid F.

The MR fluid F is a fluid including metal particles having a size of about 3 micrometers to about 10 micrometers. The MR fluid F has a property that, when a magnetic field is produced around the MR fluid F, apparent viscosity of the MR fluid F changes due to the magnetic field.

Accordingly, by applying a magnetic field to the MR fluid F that passes through the piston valve 16 and flows into the compression space 12a and the tension space 12b thus changing the apparent viscosity, a damping force of the damper 10 is controlled.

In the related art damper 10, a volume compensation means is equipped in order that a volume change of the inner space of the cylinder 12 is compensated for according as the piston rod 14 moves back and forth.

The volume compensation means includes a floating plunger 18 that is below the compression space 12a and forms a buffer space 12c, and a buffer gas G filling the buffer space 12c.

A sealing member 181 is equipped around a peripheral portion of the floating plunger 18 and contacts an inner circumferential surface of the cylinder 12 to prevent the buffer gas G from leaking. The floating plunger 18 is configured in the cylinder 12 such that the floating plunger 18 is capable of sliding up and down.

A nitrogen gas is usually used as the buffer gas G. The buffer gas G has a predetermined pressure to the extent that the floating plunger 18 is maintained at a reference height against a pressure applied through the piston valve 16. The reference height of the floating plunger 18 is a height when an external pressure is not applied.

In using the related art damper 10, shock and vibration due to a road surface when vehicle driving is transferred to the cylinder 12, thus conducted is a damping operation that a compression stoke in which the piston rod 14 and the piston valve 16 moves toward the compression space 12a and a tension stroke in which the piston rod 14 and the piston valve 16 moves toward the tension space 12b are continuously repeated.

In the compression stroke, the MR fluid F in the compression space 12a passes through the fluid path in the piston valve 16 and flows into the tension space 12b. In the tension stroke, the MR fluid F in the tension space 12b passes through the fluid path in the piston valve 16 and flows into the compression space 12a. Through these processes, vibration of the chassis spring is absorbed.

While the MR fluid F passes through the fluid path in the piston valve 16 and moves, the apparent viscosity of the MR fluid F changes due to the electromagnetic field produced by the solenoid coil 161 and flow property of the MR fluid F changes, thus a damping force of the damper 10 is controlled.

Since, in the compression stroke, a pressure is applied downwardly to the MR fluid F of the compression space 12a and the floating plunger 18 moves downwardly, and, in the tension stroke, a pressure applied to the MR fluid F of the compression space 12a decreases and the floating plunger 18 moves upwardly, compensation for volume and pressure in the cylinder 12 is made.

In other words, the buffer gas G is variably compressed in response to the pressure of the MR fluid F applied to the floating plunger 18 and gives the floating plunger 18 relative repelling force. Accordingly, the buffer gas functions like an air spring.

However, during the damping operation in the related art, the floating plunger 18 continues to move back and forth, and the buffer gas G is repeatedly compressed, thus energy is accumulated and temperature rises. Therefore, as the damping operation continues, the buffer gas G has a pressure more than an initial setting value, and further, a volume of the buffer gas G expands according to the pressure rise.

Accordingly, in the related art, due to the continuous damping operation, the temperature of the buffer gas G rises and the volume of the buffer gas G expands, thus the reference height of the floating plunger 18 moves upwardly. Therefore, the MR fluid F of the compression space 12a is pushed upwardly by the floating plunger 18. As a result, reference heights of the piston rod 14 and the piston valve 16 move upwardly.

Accordingly, a vehicle height becomes more than a normal vehicle height, and a vehicle's center of mass moves upwardly, thus running stability is degraded. Therefore, there is growing concern about vehicle overturn accident, and rolling action while running is intensified thus there is concern about degradation of ride comfort.

SUMMARY OF THE INVENTION

Accordingly, the present invention is directed to a liquid crystal display device and a method of driving the same which substantially obviates one or more of the problems due to limitations and disadvantages of the related art.

An object of the present invention is to provide a damper for continuously variably adjusting a damping force that can have a reference height of a floating plunger maintained and stably conduct a damping operation.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a damper for continuously variably adjusting a damping force includes: a cylinder; a piston rod that is inserted into the cylinder and moves back and forth; a piston valve that is coupled to a bottom portion of the piston rod and moves back and forth in the cylinder according to the movement of the piston rod; a MR fluid that fills the cylinder and moves between a tension space over the piston valve and a compression space below the piston valve; and a volume compensation means that is located in the cylinder and compensates for a volume change of an inner space of the cylinder due to the movement of the piston rod, the volume compensation means including: a floating plunger that is configured to be below the piston valve and capable of moving up and down; a coil spring that is coupled to a bottom surface of the floating plunger and supports the floating plunger; and a support cup that is fixed onto the cylinder, coupled to a bottom portion of the coil spring to support the coil spring, and forms a buffer space, along with the floating plunger, between the support cup and the floating plunger.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
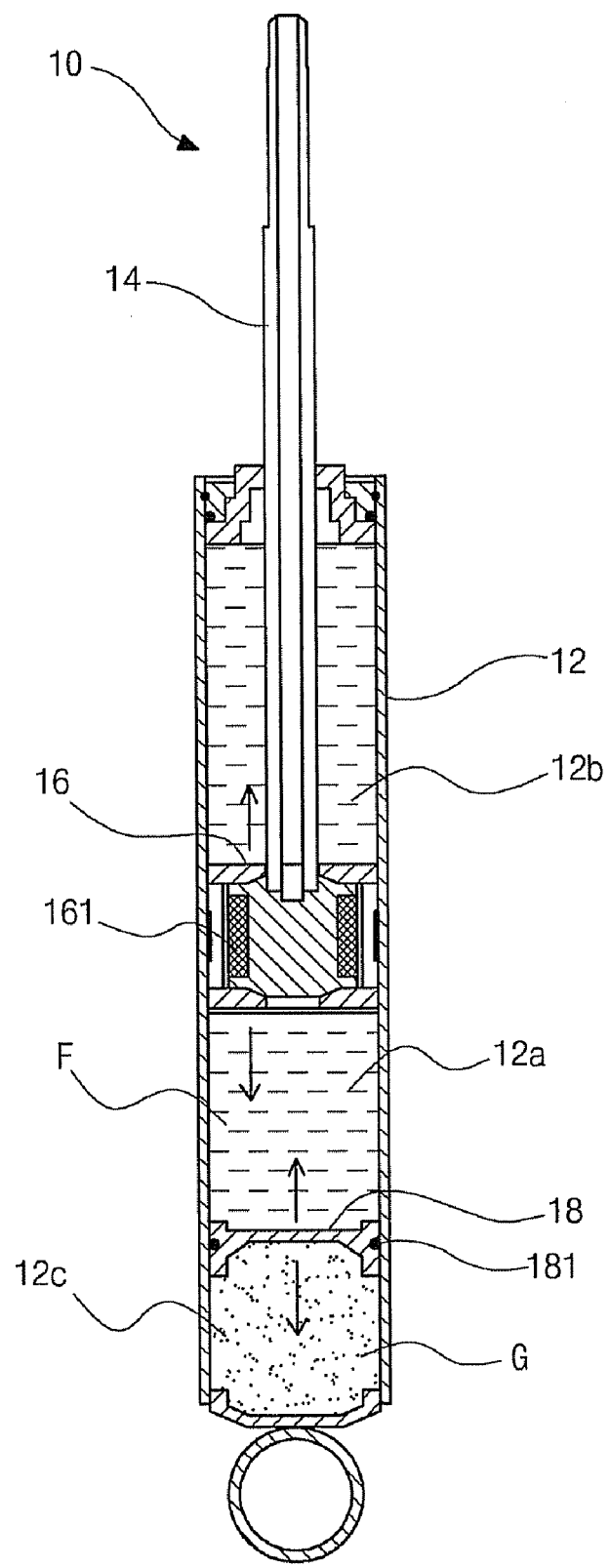
FIG. 1 is a cross-sectional view illustrating a structure of a damper for continuously variably adjusting a damping force using an MR fluid according to the related art.
Figure 2:
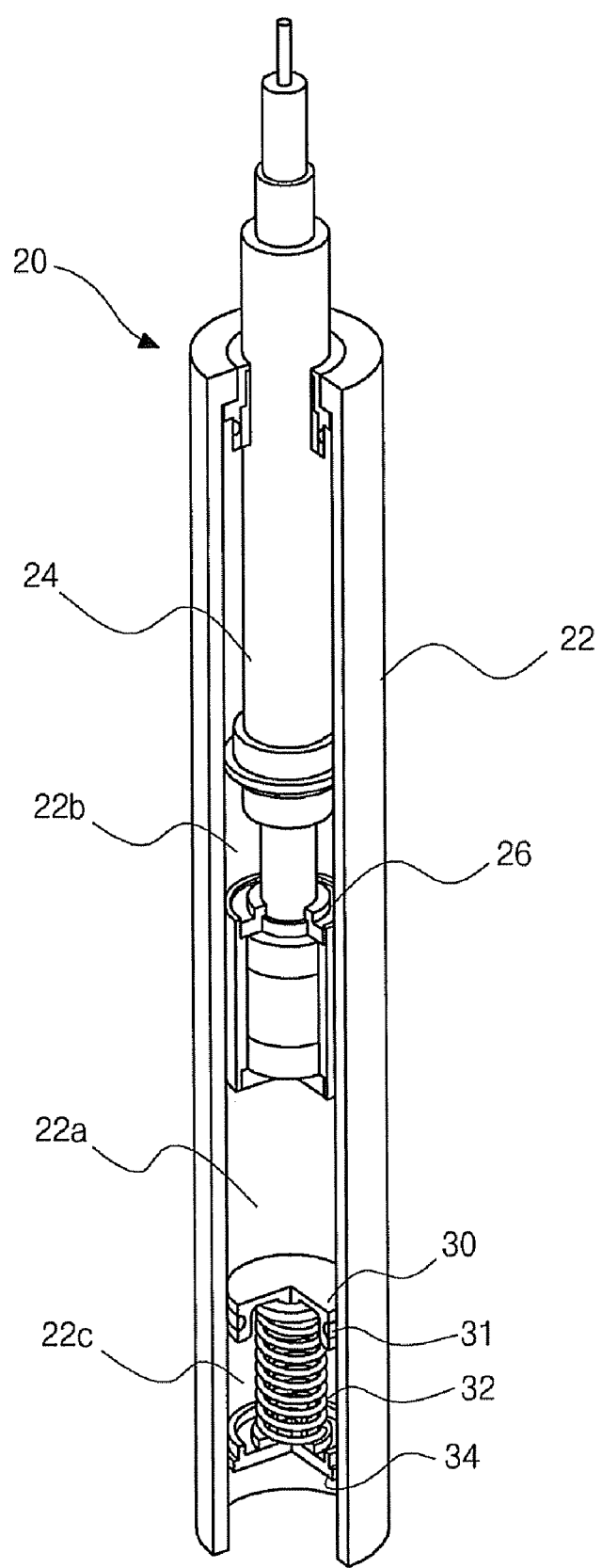
FIG. 2 is a perspective cut view illustrating a structure of a damper for continuously variably adjusting a damping force according to an embodiment of the present invention.
Figure 3:
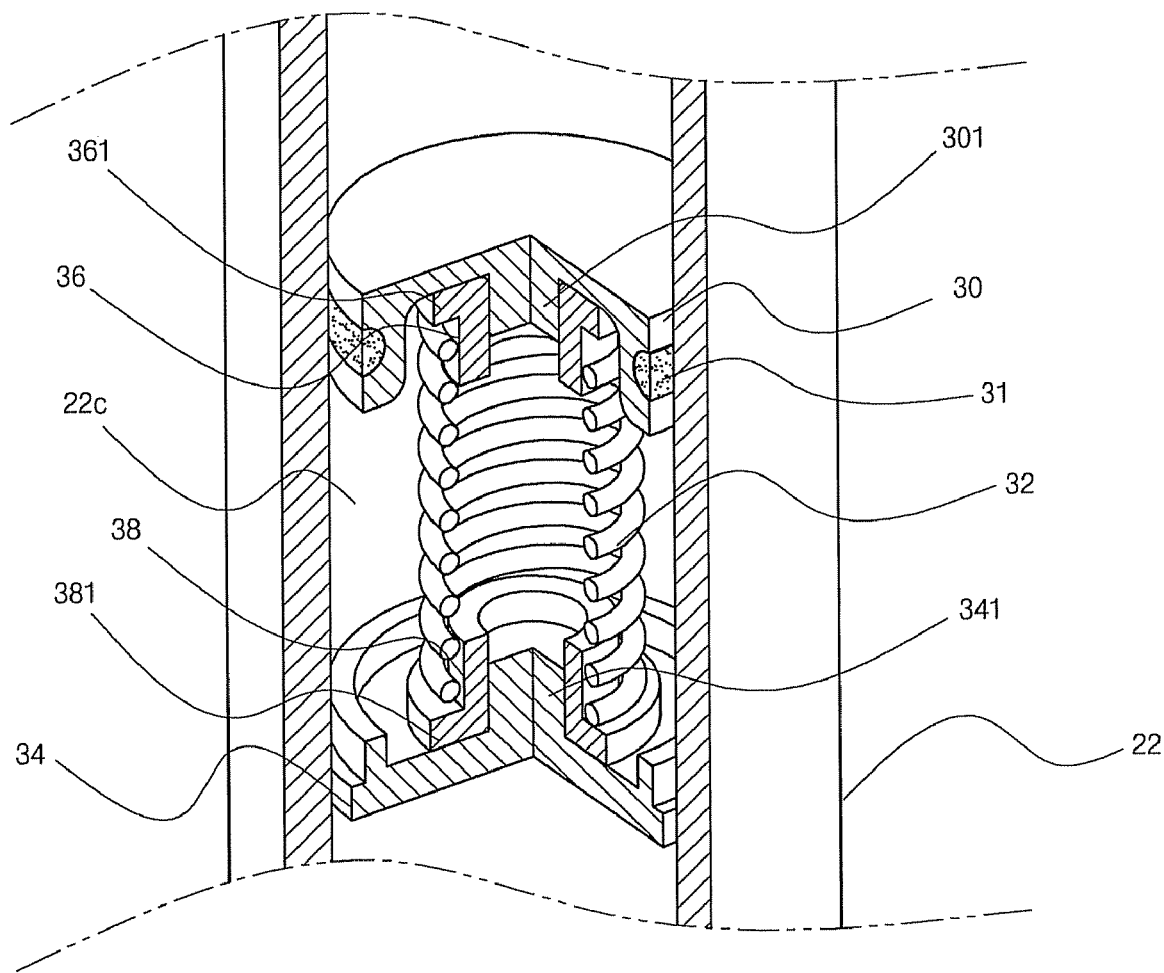
FIGS. 3 and 4 are perspective cut view and perspective exploded view, respectively, illustrating a structure of a major portion of the damper of FIG. 2.
Figure 4:
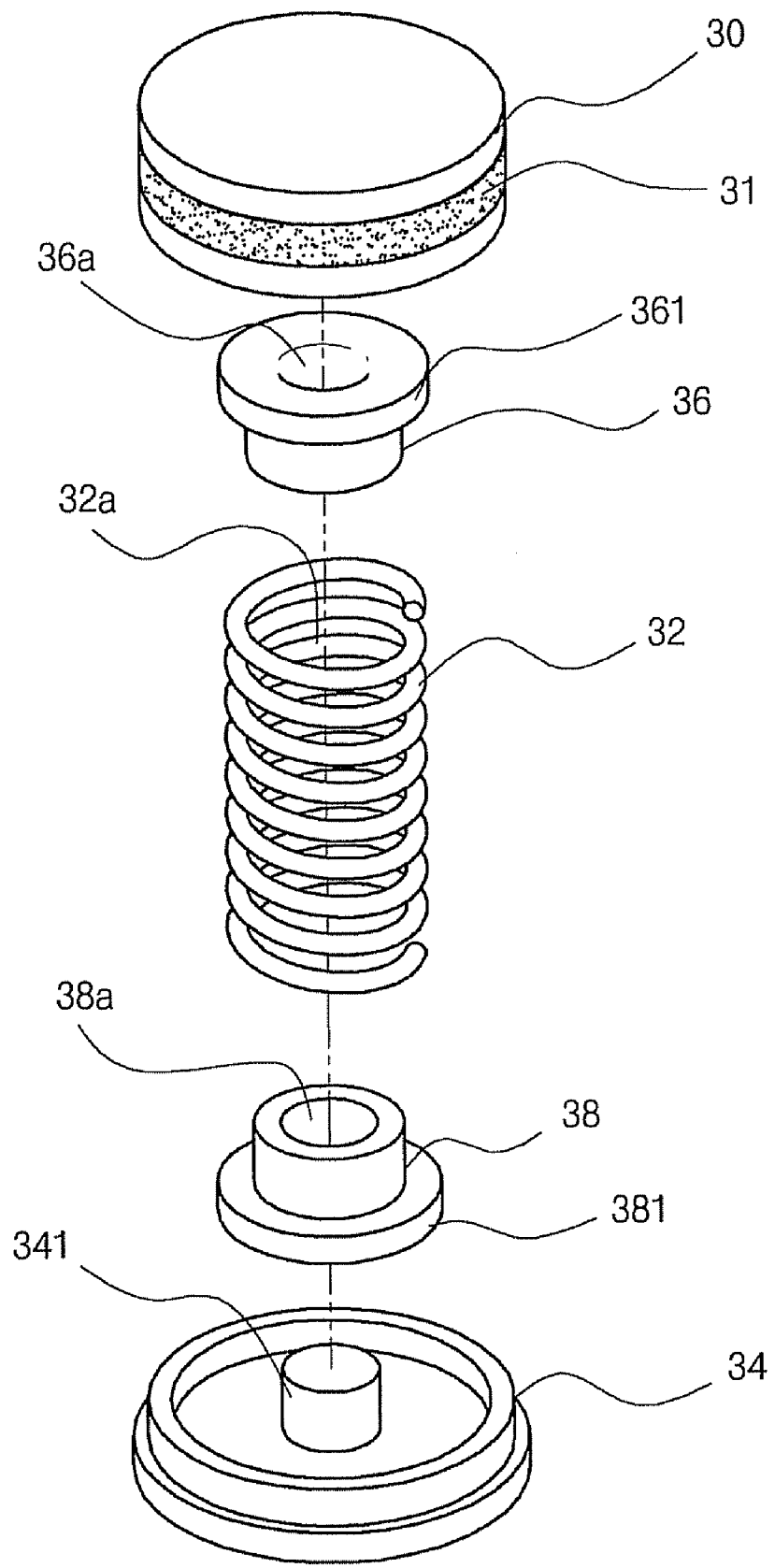

FIG. 2 is a perspective cut view illustrating a structure of a damper for continuously variably adjusting a damping force according to an embodiment of the present invention, and FIGS. 3 and 4 are perspective cut view and perspective exploded view, respectively, illustrating a structure of a major portion of the damper of FIG. 2.

Referring to FIGS. 2 to 4, the damper 20 according to the embodiment of the present invention includes a cylinder 22, a piston rod 24 that is inserted into the cylinder 22 and moves back and forth, a piston valve 26 that is coupled to a bottom portion of the piston rod 24 and moves back and forth in the cylinder 22 according to the movement of the piston rod 24, a MR fluid that fills the cylinder 22 and moves between an intension space 22b over the piston valve 26 and a compression space 22a below the piston valve 26, and a volume compensation means that is equipped in the cylinder 22 and compensates for a volume change of an inner space of the cylinder 22 due to the back and forth movement of the piston rod 22.

The volume compensation means includes a floating plunger 30 that is located below the piston valve 26 and is capable of moving up and down, a coil spring 32 that is coupled to a bottom surface of the floating plunger 30 and supports the floating plunger 30, and a support cup 34 that is fixed onto the cylinder 22, coupled to a bottom portion of the coil spring 32 and supports the coil spring 32.

A sealing member 31 is located along a peripheral portion of the floating plunger 30 and contacts an inner circumferential surface of the cylinder 22 to prevent a buffer gas from leaking. The floating plunger 30 is configured in the cylinder 22 such that the floating plunger 30 is capable of sliding up and down.

The support cup 34 is tightly coupled to the inner circumferential surface of the cylinder 22 thus forms a buffer space 22c, along with the floating plunger 30, therebetween.

The floating plunger 30 has a structure that an upper insert shaft 301 protrudes downwardly from a bottom central portion of the floating plunger 30. The support cup 34 has a structure that a lower insert shaft 341 protrudes upwardly from a top central portion of the support cup 341.

The volume compensation means may further include an upper holder 36 and a lower holder 38. The upper holder 36 prevents friction due to direct contact between the floating plunger 30 and a top portion of the coil spring 32, and the lower holder 38 prevents friction due to direct contact between the cup support 34 and a bottom portion of the coil spring 32.

The upper holder 36 has a structure that an insert hole 36a is formed at a central portion of the upper holder 36 and a wing portion 361 protrudes outwardly along an outer circumferential surface of the upper holder 36.

Referring to FIG. 4, the upper holder 36 is coupled to the floating plunger 30 by fitting the upper insert shaft 301 into the insert hole 36a. Further, the upper holder 36 is coupled to the coil spring 32 by inserting a lower portion of the upper holder 36 into a bore 32a of the coil spring 32.

In a state that the upper holder 36 is coupled to the floating plunger 30 and the coil spring 32, the wring portion 361 is located between the top portion of the coil spring 32 and the bottom surface of the floating plunger 30.

In similar to the upper holder 36, the lower holder 38 has a structure that an insert hole 38a is formed at a central portion of the lower holder 38 and a wing portion 381 protrudes outwardly along an outer circumferential surface of the lower holder 38.

The lower holder 38 is coupled to the support cup 34 by fitting the lower insert shaft 341 into the insert hole 38a. Further, the lower holder 38 is coupled to the coil spring 32 by inserting a top portion of the lower holder 38 into the bore 32a of the coil spring 32.

In a state that the lower holder 38 is coupled to the support cup 34 and the coil spring 32, the wring portion 381 is located between the bottom portion of the coil spring 32 and the top surface of the support cup 34.

It is preferred that the upper holder 36 and the lower holder 38 are made of a material having strong abrasion resistance, such as Teflon.

The buffer gas filling the buffer space 22c between the floating plunger 30 and the support cup 34 may have about atmospheric pressure.

The operation of the damper 20 is explained in more detail as follows.

In a compression stroke that the piston rod 24 is pushed inside of the cylinder 22, the piston valve 26 moves downwardly thus the MR fluid of the compression space 22a is pressed. Accordingly, the floating plunger 30 is pressed by the MR fluid thus moves downwardly.

Since the coil spring 32 is fixed to the support cup 34 through the bottom portion of the coil spring 32, the coil spring 32 is compressed by the floating plunger 30 and variably accumulates an elastic repelling force according to the compression extent.

The buffer gas filling the buffer space 22c between the floating plunger 30 and the support cup 34 is also compressed.

In a tension stroke that the piston rod 24 is drawn outside of the cylinder 22, the piston valve 26 moves upwardly, thus the downward pressure to the MR fluid is stopped and the floating plunger 30 moves upwardly.

The compressed coil spring 32 is elastically repelled and springs back upwardly, thus the coil spring 32 pushes the floating plunger 30 upwardly.

In the operation of the damper 20, a free length of the coil spring 32 does not change because of the structural nature of the coil spring 32. The free length of the coil spring 32 is a length in a state that an external force is not applied to the coil spring 32.

Accordingly, in a case that the compression stroke and the tension stroke are repeated for a long time, even though the buffer gas in the buffer space 22c is little heated and expanded, because the floating plunger 30 is coupled to the coil spring 32 and the pressure of the buffer gas is not high, prevented can be a phenomenon that a reference height of the floating plunger 30 moves upwardly due to the expansion of the buffer gas.

Further, the top portion of the coil spring 32 and the floating plunger 30 are coupled to each other through the upper holder 36, and the bottom portion of the coil spring 32 and the support cup 34 are coupled to each other through the lower holder 38. Accordingly, prevented can be a phenomenon that, when the upper holder 36 and the lower holder 38 are not used, each of a contact portion of the coil spring 32 and the floating plunger 30 and a contact portion of the coil spring and the support cup 34 are worn out and damaged due to a friction therebetween.

In particular, in the compression and expansion operations of the coil spring 32, upward and downward shocks are caused from the top portion and the bottom portion of the coil spring 32. However, since the wing portion 361 of the upper holder 36 is intervened between the top portion of the coil spring 32 and the floating plunger 30 and the wing portion 381 of the lower holder 38 is intervened between the bottom portion of the coil spring 32 and the support cup 34, effectively prevented can be a phenomenon that the floating plunger 30 and the support cup 34 are worn out.

As described above, since the floating plunger is supported by the coil spring, the reference height of the floating plunger can be maintained at a predetermined height irrespectively of variation of temperature. Accordingly, prevented can be a phenomenon that a vehicle height becomes more that a normal vehicle height.

Therefore, concern about vehicle overturn accident and degradation of ride comfort due to upward movement of a vehicle's center of mass can be removed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A damper for continuously variably adjusting a damping force, comprising:
    a cylinder;
    a piston rod that is inserted into the cylinder and moves back and forth;
    a piston valve that is coupled to a bottom portion of the piston rod and moves back and forth in the cylinder according to the movement of the piston rod;
    a MR fluid that fills the cylinder and moves between a tension space over the piston valve and a compression space below the piston valve; and
    a volume compensation means that is located in the cylinder and compensates for a volume change of an inner space of the cylinder due to the movement of the piston rod, the volume compensation means including:
    a floating plunger that is configured to be below the piston valve and capable of moving up and down;
    a coil spring that is coupled to a bottom surface of the floating plunger and supports the floating plunger; and
    a support cup that is fixed onto the cylinder, coupled to a bottom portion of the coil spring to support the coil spring, and forms a buffer space, along with the floating plunger, between the support cup and the floating plunger;
    wherein the volume compensation means further includes:
    an upper holder that prevents friction between the floating plunger and a top portion of the coil spring due to a direct contact therebetween; and
    a lower holder that prevents friction between the bottom portion of the coil spring and the support cup due to a direct contact therebetween; and
    wherein the floating plunger includes an upper insert shaft that protrudes downwardly from the bottom surface of the floating plunger, and the upper holder includes an insert hole at a central portion of the upper holder, wherein the upper insert shaft is fitted into the insert hole to couple the floating plunger and the upper holder, and a bottom portion of the upper holder is inserted into a bore of the coil spring to couple the upper holder and the coil spring.

2. The damper according to claim 1, wherein the support cup includes a lower insert shaft that protrudes upwardly from a top surface of the support cup, and the lower holder includes an insert hole at a central portion of the lower holder, wherein the lower insert shaft is fitted into the insert hole to couple the support cup and the lower holder, and a top portion of the lower holder is inserted into a bore of the coil spring to couple the lower holder and the coil spring.

3. The damper according to claim 1, wherein the upper holder includes a wing portion that is located between the top portion of the coil spring and the bottom surface of the floating plunger and prevents vertical shock of the coil spring from directly being applied to the floating plunger.

4. The damper according to claim 2, wherein the lower holder includes a wing portion that is located between the bottom portion of the coil spring and the top surface of the support cup and prevents vertical shock of the coil spring from directly being applied to the support cup.

5. The damper according to claim 1, wherein the buffer space is filled with a buffer gas having about atmospheric pressure.

* * * * *